United States Patent Office 2,808,397
Patented Oct. 1, 1957

2,808,397

PRODUCTION OF HYDROXYETHER AMIDES OF POLYACRYLIC ACID

Rudolf Stroh and Josef Ebersberger, Leverkusen-Bayerwerk, Germany, assignors to Farbenfabriken Bayer Aktiengesellschaft, Leverkusen, Germany, a corporation of Germany No Drawing. Application February 16, 1953, Serial No. 337,218

Claims priority, application Germany February 23, 1952

6 Claims. (Cl. 260—89.7)

The present invention relates to a process of producing hydroxyether amides of polyacrylic acid.

It is known to produce surface-active products by hydroxyalkylation of fatty acid amides (German Patent 667,744). Furthermore, it is known to prepare polymers by polymerizing hydroxyamides of acrylic acid. Such polymers may be employed for instance as assistants in the textile industry (French Patent 885,738).

It is an object of the present invention to provide a novel and convenient process of producing hydroxyether amides of polyacrylic acid. According to the invention this is effected by reacting polyacrylamide, or an N-substitution product thereof having one free hydrogen atom or at least one hydroxyalkyl radical attached to the nitrogen atom, with an alkylene oxide or functional derivative thereof such as a halohydrin or α.α'-halogeno-hydroxyether, if necessary in the presence of a basic-reacting substance.

By means of this reaction hydroxyether groups are introduced into polyacrylamide or polymers of substituted acrylamides in which a free hydrogen atom or hydroxyalkyl group is attached to the nitrogen atom, for example acrylic acid ethyl amide.

It was not to be foreseen by one skilled in the art that hydroxyalkylation could be applied to polymers such as those of the amides of acrylic acid.

The reaction is preferably carried out by dissolving polyacrylamide in a suitable solvent, for example water, and introducing an alkylene oxide, for example ethylene oxide, into the solution under pressure after addition of a catalyst. Basic reacting substances such as hydroxides and alcoholates of alkali metals, and surface-active materials such as Fuller's earth, have proved particularly suitable catalysts. The quantity of the alkylene oxide to be added varies within wide limits and depends upon the properties desired in the end product.

Apart from the reaction of alkylene oxides upon polyacrylamides in the presence of catalysts, there is a further embodiment of the process of the invention which consists in reacting polyacrylamide with α.α'-halogeno-hydroxyethers, for instance halohydrins of polyglycols of the general formula:

X.CH₂.CH₂.(OCH₂.CH₂)ₙ.OH wherein X is a halogen atom and n is an integer of at least 1.

To bind the hydrogen halide which is set free in this reaction the process is preferably carried out in the presence of alkali metal hydroxides or carbonates.

Apart from polymers of acrylamides, copolymers of acrylamides and other polymerizable compounds such as acrylates, acrylonitrile and vinyl acetate, are amenable to the reaction. The use of these copolymers enables products to be obtained having properties which can be varied within wide limits.

The products obtained by the above described process are valuable auxiliary agents for the pharmaceutical industry and for plant protection.

The invention is further illustrated by the following example in which the parts given are by weight.

Example 175 parts of an aqueous solution of polyacrylamide (11 percent) is mixed with 3 parts of N caustic soda solution and reacted with 200 parts of ethylene oxide at 100° C. in an autoclave. It is preferable to add the ethylene oxide in successive portions and to delay the addition of a fresh portion of ethylene oxide until the portion last added has substantially been consumed, which can easily be determined by observing the decrease in pressure. The reaction product thus obtained is a viscous liquid.

We claim:

1. A process for the production of viscous aqueous solutions of water-soluble N-substituted homopolyacrylamides, said N-substituents being those of the formula —R(O—R)ₙOH, wherein R is the alkylene residue of an alpha, beta-alkylene epoxide and n is an integer of at least 1 which comprises reacting, in aqueous solution and at elevated temperature, water-soluble polyacrylamide having at least one hydrogen atom attached to the nitrogen atom with a lower alkylene oxide.

2. A process for the production of viscous aqueous solutions of water-soluble N-substituted homopolyacrylamides, said N-substituents being those of the formula —R(O—R)ₙOH, wherein R is the alkylene residue of an alpha, beta-alkylene epoxide and n is an integer of at least 1 which comprises reacting, in aqueous solution and at elevated temperature, water-soluble polyacrylamide having at least one hydrogen atom attached to the nitrogen atom with a lower alkylene oxide in the presence of a basic reacting substance.

3. A process for the production of viscous aqueous solutions of water-soluble N-substituted homopolyacrylamides, said N-substituents being those of the formula —R(O—R)ₙOH, wherein R is the alkylene residue of an alpha, beta-alkylene epoxide and n is an integer of at least 1 which comprises reacting, in aqueous solution and at elevated temperature, water-soluble polyacrylamide having at least one hydrogen atom attached to the nitrogen atom with a halohydrin of the general formula:

X.CH₂.CH₂.(OCH₂.CH₂)ₙ.OH wherein X is a halogen atom and n is an integer of at least 1.

4. A process for the production of viscous aqueous solutions of water-soluble N-substituted homopolyacrylamides, said N-substituents being those of the formula —R(O—R)ₙOH, wherein R is the alkylene residue of an alpha, beta-alkylene epoxide and n is an integer of at least 1 which comprises reacting, in aqueous solution and at elevated temperature, water-soluble polyacrylamide having at least one hydrogen atom attached to the nitrogen atom with a halohydrin of the general formula:

X.CH₂.CH₂.(OCH₂.CH₂)ₙ.OH wherein X is a halogen atom and n is an integer of at least 1 in the presence of a basic reacting substance.

5. Water-soluble N-substituted homopolyacrylamides, said N-substituents being those of the formula

—R(O—R)ₙOH wherein R is the alkylene residue of an alpha,beta-alkylene epoxide and $n$ is an integer of at least 1.

6. Water-soluble N-substituted homopolyacrylamides, said N-substituents being those of the formula $$-CH_2CH_2(OCH_2CH_2)_nOH$$

wherein $n$ is an integer of at least 1.

References Cited in the file of this patent

UNITED STATES PATENTS

| | | |
|---|---|---|
| 1,976,679 | Fikentscher et al. | Oct. 9, 1934 |
| 2,404,781 | Arnold | July 30, 1946 |
| 2,470,081 | Thurston et al. | May 10, 1949 |
| 2,533,166 | Jones | Dec. 5, 1950 |